Nov. 19, 1963    N. D. FULTON ETAL    3,111,133
EXPLOSIVE ACTUATED NORMALLY CLOSED VALVE
Filed Aug. 11, 1959

INVENTORS: N.D. FULTON
R.J. NOVOTNY
BY
ATTORNEY

3,111,133
EXPLOSIVE ACTUATED NORMALLY CLOSED VALVE

Nathaniel D. Fulton, Bernardsville, N.J., and Raymond J. Novotny, Sunnyvale, Calif., assignors, by mesne assignments, to Hydro-Space Technology Incorporated, West Caldwell, N.J., a corporation of Delaware
Filed Aug. 11, 1959, Ser. No. 833,051
12 Claims. (Cl. 137—68)

The present invention relates to explosive actuated valves and more particularly to such valves of the normally closed type.

Explosive actuated normally closed valves, because of their small size, low power requirement, fast action, and high fluid pressure capacity, have been found to be useful for fuel control valves in jet propelled or rocket propelled projectiles, for discharge control valves for fire extinguishers, for fluid release valves in fire fighting systems, and for many other applications where high fluid pressures are encountered and where remote control, minimum size and minimum weight are requirements. Known normally closed explosive actuated valves comprise generally a valve body with an inlet and outlet port sealed from each other by a frangible sealing member, usually a metallic diaphragm. Enclosed within the valve body is a squib, the explosive gases of which actuate a ram or plunger which fractures the sealing diaphragm thus permitting the fluid to flow through the valve.

The known valves of the general type described above, although having many advantages over solenoid, motor and hand operated valves, have one or more disadvantages and faults which make them undesirable in one or more respects for some applications. For example, in many of the explosive actuated normally closed valves the member which seals the inlet port from the outlet port is an integral part of the valve body, and after the valve is actuated and this member is fractured the valve cannot be reused a second time. An additional disadvantage of the known valves of this general type is attributable to the lack of active support for the sealing member which seals the inlet port from the outlet port when the valve is in its normal unactuated condition. This lack of support makes the sealing member susceptible to deformation or accidental rupture due to pressure surges in the inlet fuel line. Although rupture of the sealing member may not occur, it may become so deformed as the result of repeated pressure surges on the inlet fluid line that complete actuation of the valve is prevented when the squib is fired. Thus, where high pressure surges are prevalent on a fluid line and where the utmost in reliability is mandatory, the known explosive actuated normally closed valves have failed to be completely satisfactory.

A further disadvantage of the known valves of the general type described above is encountered when the valves are utilized in fluid lines where extremely high fluid pressures are present. It has been necessary in this instance to provide a valve in which the sealing member is substantially stronger than is required for the usual application in order to withstand the high fluid pressures. This has required the use of an explosive charge of greater power in these valves to insure a complete fracture of the sealing member when the valve is actuated. As a result of this, the body of the valve must be larger and stronger in order to withstand the higher explosive charge.

An additional disadvantage of the known valves is attributable to fluid compression or "line hammer" in the inlet fluid line when the valves are actuated. Due to the construction of these valves the fluid in the inlet line is subjected to a compressional force when the valves are actuated. This is particularly serious when the fluid controlled by the valve is an explosive which can be detonated by such compressional forces. Another disadvantage of many of the known explosive actuated normally closed valves is encountered when the squib gas pressure, after the valve is actuated, is accidentally lowered or lost due to a faulty sealing gasket or O-ring seal. When this occurs the ram or plunger, which is actuated by the squib gas pressure to fracture or shear the sealing member between the inlet and outlet ports, may be forced by the fluid pressure in the inlet fluid line back into its original unoperated position. This results in a partial blockage or sometimes a complete blockage of the flow of fluid through the valve. Partial and sometimes complete blockage of the outlet fluid lines has also occurred in many of the known valves as the result of fragments of the sealing member being forced into or through the outlet port of the valve by the fluid pressure in the inlet fluid line after the valves are actuated. In some instances, although these fragments are not large enough to cause a blockage of the fluid passage, contamination of the fluid in the outlet fluid line results which causes damage to apparatus to which the fluid flow is directed.

It is an object of the present invention to provide an improved explosive actuated normally closed valve which has none of the above-described objections and disadvantages.

Further objects of the present invention are to provide an explosive actuated normally closed valve that is reusable, that is less expensive to manufacture, that is more reliable in operation, and that will operate under higher inlet fluid line pressures.

Additional objects of the present invention are to provide an explosive actuated normally closed valve that is smaller in size, lighter in weight, and concomitantly has an absolute minimum of pressure loss for a given fluid flow rate.

It is also an object of the present invention to provide a universal explosive actuated normally closed valve that can readily be adapted to different sizes of inlet fluid lines and different inlet fluid line pressures.

The foregoing and other objects of the present invention are attained in an illustrative embodiment thereof comprising a valve body with aligned inlet and outlet ports providing a straight fluid flow passage therethrough. The valve body is adapted to be connected to inlet and outlet fluid lines respectively. The sealing member of the valve, by means of which a normally closed condition is attained, is a sealing disc integral with and enclosing one end of an inlet fitting. This inlet fitting is adapted to be threaded onto the end of the inlet fluid line and into the inlet port of the valve body. Slidably mounted in a two-section actuating chamber extending transversely with respect to the inlet and outlet ports in the valve body is a shearing member containing a cylindrical cavity into which the sealing disc of the inlet fitting extends when the valve is in its unactuated condition. The valve is actuated or opened when a squib located at one end of the firing section of the actuating chamber of the valve body is fired. Squib actuation may be either electrical or by percussion. Separating the squib in the firing section of the actuating chamber and the shearing member extending into the shearing section of the actuating chamber of the valve body is an actuating piston. The explosive gases resulting from the firing of the squib force the piston against the end of the shearing member causing it to move longitudinally in the actuating chamber shearing the sealing disc from the end of the inlet fitting. The sheared-off sealing disc is retained in the cylindrical cavity of the shearing member and is moved out of the flow path between the inlet and outlet ports of the valve body. The shearing member also has a through hole which, when the shearing member is in its fully actuated position, registers with the inlet and outlet ports of the valve body thus enabling the pressurized fluid in the inlet fluid line to flow through the valve in a uniform path with a minimum of flow path deviation and turbulence.

It is a feature of the present invention that an actuating piston separate and seal the squib in the firing section of the actuating chamber from the shearing member extending into the shearing section of the actuating chamber of the valve and that this actuating piston, in response to the rapid expansion of the explosive gases when the squib is fired, force the shearing member to shear the sealing disc from the inlet fitting. In accordance with this feature, an improved seal is thus provided between the firing section and the shearing section of the actuating chamber. This reduces the possibility that the explosive gases resulting from the firing of the squib will be able to contaminate the fluid flowing through the valve. Furthermore, the separate actuating piston advantageously cooperates with the shearing member to provide an additional feature of the invention.

In accordance with this additional feature of the invention, the end of the shearing member, which cooperates with the actuating piston, has a passage therethrough which, when the valve is in the actuated or opened condition, permits the fluid in the inlet fluid line to exert a pressure on the actuating piston, which pressure is in the opposite direction to the pressure applied to the actuating piston by the explosive gases. In the event of the accidental loss of any portion of the explosive gases to the atmosphere, which results in the reduction of the pressure exerted by these gases on the actuating piston, the pressurized fluid in the inlet fluid line will flow through the passage in the shearing member and force the actuating piston back toward its normal or unactuated position. This fluid, which flows through the passage in the shearing member, equalizes the pressure applied to the shearing member by compensating for the loss or the lowering of the pressure applied thereto by the actuating piston. In this manner the shearing member is maintained in its actuated position. Thus once the valve is actuated, it is in effect locked in the actuated position by the pressure of the fluid in the inlet fluid line and the possibility of the through hole in the shearing member being moved out of register with the inlet and outlet ports of the valve body is substantially reduced or eliminated.

It is another feature of the present invention that the sealing member of an explosive actuated normally closed valve be an integral part of an inlet fitting which is threaded into an inlet port of the valve body. Thus the valve may readily and advantageously be reused by merely removing the sheared disc from the cylindrical cavity in the shearing member, replacing the inlet fitting, moving the actuating piston and shearing member to their respective unactuated positions in the actuating chamber, and inserting an unfired squib into the actuating chamber.

It is also a feature of the present invention that one type and size of valve body be usable with any selected one of several sizes and types of inlet fittings having integral sealing discs. Thus the valve of the present invention is advantageously readily adaptable to various sizes of inlet fluid lines and to various fluid line pressures and fluid compositions by utilizing a selected inlet fitting having the desired fluid line diameter and thread and consisting of a material compatible with the fluid with an appropriate integral sealing disc for the inlet fluid line pressure.

It is a further feature of the present invention that the shearing member have a cavity into which the sealing disc of the inlet fitting extends, which cavity not only shears the disc from the inlet fitting when the valve is actuated but also retains the sheared-off disc after actuation of the valve. The longtudinal movement of the shearing member to its fully actuated position in the actuating chamber carries the sheared-off disc out of the fluid flow path of the actuated valve. Thus the sheared-off disc is prevented from blocking the fluid flow passage through the actuated valve or from causing damage to apparatus to which the fluid flow is directed.

In accordance with an additional feature of the invention, the sealing disc of the inlet fitting is actively supported by the shearing member of the valve when the valve is normal or unactuated. This advantageously enables the valve of the present invention to be utilized on fluid lines having higher fluid line pressures without the heretofore required increase in the size and strength of the valve sealing member and the heretofore required increase in the size and power of the squib needed to actuate the valve.

The foregoing and other objects and features of this invention will be more readily understood from the following description of an illustrative embodiment thereof when read with reference to the accompanying drawing in which.

Figure 1:
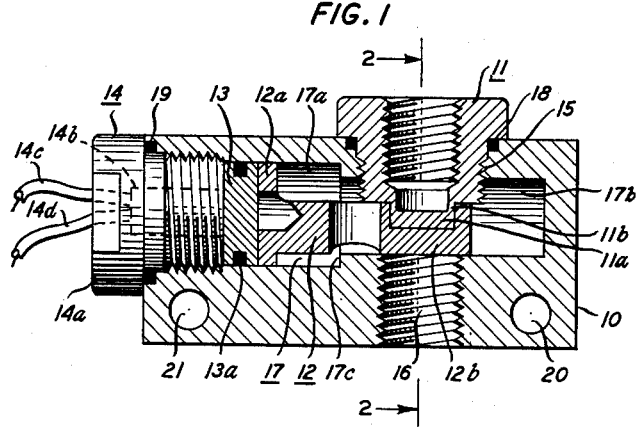
FIG. 1 is a sectional view of an illustrative explosive actuated normally closed valve in accordance with the present invention and shows the valve in its normal or unactuated condition.

Referring now to the drawing, an illustrative embodiment of an explosive actuated normally closed valve in accordance with the principles of this invention will be described in detail. As shown in FIGS. 1 through 4, the valve comprises generally a valve body 10, an inlet fitting 11, a shearing member 12, an actuating piston 13, all of which may advantageously be fabricated of aluminum or any other suitable material, and a squib assembly 14.

Figure 3:
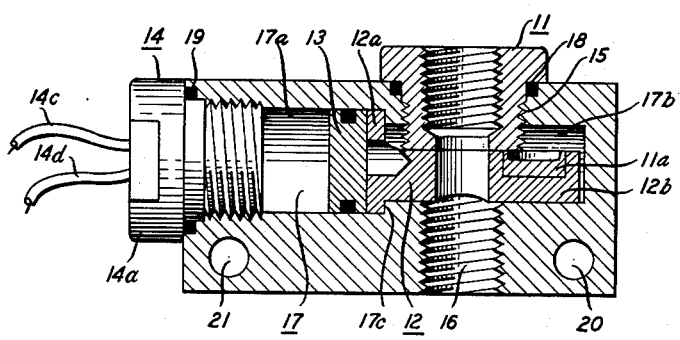
FIG. 3 is a sectional view of the illustrative valve shown in FIG. 1 and shows the valve in its fully actuated condition.

Valve body 10 has a threaded inlet port 15 adapted to receive threaded inlet fitting 11, which fitting is also adapted to be threaded onto the end of an inlet fluid line (not shown). Aligned with inlet port 15 in valve body 10 is a threaded outlet port 16 which is adapted to receive a threaded outlet fluid line (not shown). Valve body 10 also has a cylindrically shaped actuating chamber 17 extending transversely with respect to inlet port 15 and outlet port 16. Actuating chamber 17 in valve body 10 comprises a firing section 17a which extends to and is axial with a smaller diameter shearing section 17b as shown in FIGS. 1 and 3. The end of firing section 17a opposite shearing section 17b is threaded to receive squib assembly 14. Valve body 10 is counterbored at inlet port 15 and at the end of firing section 17a which receives squib assembly 14 to permit installing O-ring seals 18 and 19 respectively. A pair of mounting holes 20 and 21 are provided in valve body 10 to facilitate mounting the valve on a frame or rack if desired.

Integral with and sealing the end of inlet fitting 11 is a sealing disc 11a by means of which fluid is prevented from flowing through the straight fluid flow passage in valve body 10 between inlet port 15 and outlet port 16 when the valve is in its normal unactuated condition. Sealing disc 11a, which is integrally connected to inlet fitting 11 by the cylindrical wall 11b, provides the means in accordance with the invention whereby the valve is normally closed. As will be described, sealing disc 11a is sheared off when the valve is opened or actuated.

Figure 2:
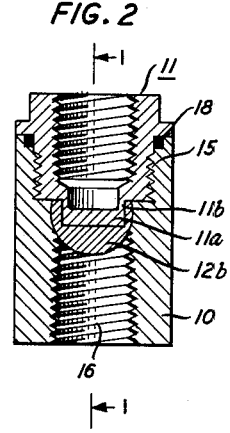
FIG. 2 is a sectional view of the valve of FIG. 1 taken along line 2—2.
Figure 4:
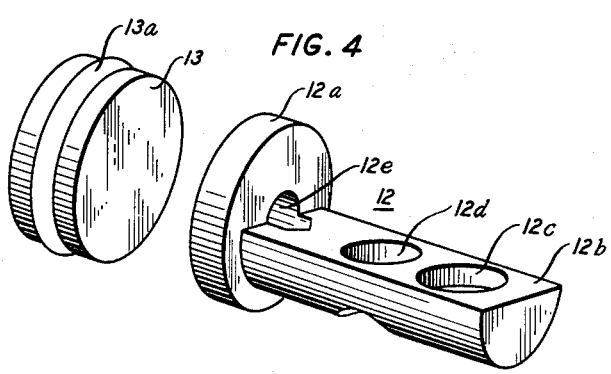
FIG. 4 is an enlarged view in perspective of the shearing member and actuating piston in accordance with the invention utilized in the embodiment of FIGS. 1, 2 and 3.

As shown particularly in FIG. 4, shearing member 12 comprises a disc-shaped portion 12a and a smaller diameter segmented right circular cylindrical portion 12b integral therewith. Segmented cylindrical portion 12b extends axially from disc-shaped portion 12a and is concentric therewith. As shown in FIGS. 1 and 3, disc-shaped portion 12a is adapted to be slidably movable in firing section 17a of actuating chamber 17 with the segmented cylindrical portion 12b extending into and slidably movable in shearing section 17b. The plane surface of segmented cylindrical portion 12b of shearing member 12 has a cylindrical cavity 12c adapted to receive and provide active support for sealing disc 11a of inlet fitting 11 when the valve is in its normal unactuated condition as shown in FIGS. 1 and 2. The plane surface of segmented cylindrical portion 12b of shearing member 12 has a through hole 12d which registers with inlet port 15 and outlet port 16 in valve body 10 when the valve is in its fully actuated condition as shown in FIG. 3. Shearing member 12 also has a fluid passage 12e which permits the pressurized fluid present in shearing section 17b of actuating chamber 17 to exert a pressure on actuating piston 13, which pressure opposes the pressure applied to actuating piston 13 by the explosive gases resulting from the firing of the explosive charge in squib assembly 14 as will be described hereinafter.

Actuating piston 13, which is provided with O-ring seal 13a, is slidably positioned in firing section 17a of actuating chamber 17 between the disc-shaped end portion 12a of shearing member 12 and squib assembly 14. O-ring seal 13a provides a gas-tight seal between firing section 17a and shearing section 17b of actuating chamber 17 to prevent the explosive gases from escaping into shearing section 17b and contaminating the pressurized fluid therein when the valve is actuated.

Squib assembly 14 comprises a threaded cap 14a which may advantageously be fabricated of aluminum or any other suitable material and which is adapted to be threaded into the threaded end of firing section 17a of actuating chamber 17 with a gas-tight seal provided by O-ring seal 19. Included within cap 14a and imbedded in suitable packing, not shown, is an electrically fired squib 14b, shown dotted in FIG. 1. Squib 14b is connected to a pair of leads 14c and 14d which extend through a sealed opening in cap 14a and which may be connected to any suitable source of electrical current.

When an electrical circuit, which includes leads 14c and 14d and a source of potential, is closed in any manner known in the art as by the operation of a switch or a relay, current will flow in the circuit and fire squib 14b. The explosive gases resulting from the firing of squib 14b force actuating piston 13 against shearing member 12. This force drives shearing member 12 to the right in actuating chamber 17 which results in the rapid shearing of disc 11a from the end of inlet fitting 11. Cylindrical cavity 12c in shearing member 12 not only shears disc 11a from inlet fitting 11 but also carries the sheared-off disc 11a out of the fluid flow path between inlet port 15 and outlet port 16 in valve body 10 as shown in FIG. 3. Shearing member 12 is carried by the force exerted thereon by actuating piston 13 to its fully actuated position shown in FIG. 3 whereat disc portion 12a is held in abutment with the circular shoulder 17c formed by the smaller diameter shearing section 17b in actuating chamber 17. When shearing member 12 is driven to its fully actuated positioin as shown in FIG. 3, through hole 12d thereof registers with inlet port 15 and outlet port 16 of valve body 10 to provide a straight fluid flow path through valve body 10. Thus a minimum of flow-path deviation and turbulance results when the valve is actuated.

Normally, shearing member 12 is held in its fully actuated position shown in FIG. 3 by the pressure exerted thereon by actuating piston 13. In the event, however, of a faulty O-ring seal 19, or if for some other reason the pressure exerted by the explosive gases on actuating piston 13 is lowered, the pressurized fluid in shearing section 17b of actuating chamber 17 will flow through passage 12e in shearing member 12 and will exert a pressure on actuating piston 13 which tends to move actuating piston 13 toward its normal position. The fluid which flows through passage 12e also exerts a pressure on shearing member 12 to compensate for the loss of pressure exerted thereon by actuating piston 13. Thus the pressurized fluid in effect locks shearing member 12 in its fully actuated position and advantageously prevents its movement. Because shearing member 12 is prevented from moving, the accidental blockage thereby of the fluid flow path between inlet port 15 and outlet port 16 is prevented.

In accordance with an aspect of the present invention, the provision of integral sealing disc 11a on inlet fitting 11, which provides the normally closed condition of the valve, advantageously permits the valve to be reused again after it has once been fired. Thus it is only necessary to remove the sheared-off sealing disc 11a from the cylindrical cavity 12c of shearing member 12, replace inlet fitting 11 with a new fitting, that is, one in which the sealing disc 11a has not been sheared off, move shearing member 12 and actuating piston 13 to their normal positions as shown in FIG. 1, and install a new squib assembly 14 in valve body 10.

In accordance with another aspect of the present invention, the provision of sealing disc 11a as an integral part of inlet fitting 11 advantageously adapts the valve of the present invention for use with various sizes of inlet fluid lines and with various fluid line pressures. Thus inlet fitting 11 may be manufactured for various sizes and threads of inlet fluid lines and can be selectively utilized in valve body 10 to adapt the valve to the required size and thread for any inlet fluid line. Furthermore, inlet fitting 11 may be manufactured for various inlet fluid line pressures by changing the thickness of cylindrical wall 11b integrally connecting disc 11a with the main body of inlet fitting 11, can be selectively utilized in valve body 10 to adapt the valve to the correct inlet fluid line pressure, and can be made compatible with any fluid by making it of suitable material.

As indicated hereinbefore, another aspect of the present invention is directed to the provision of active support for the sealing member of the valve when the valve is in its normal or unactuated condition. This support eliminates the possibility that pressure surges or unexpected high pressures in the inlet fluid line will cause the accidental rupture of the sealing member. This is accomplished in accordance with the invention in the manner shown in FIG. 1 by shearing member 12 which spans outlet port 16. When inlet fitting 11 is threaded into inlet port 15, sealing disc 11a extends into and is supported by cylindrical cavity 12c as shown.

It is to be understood that the above-described embodiment is but illustrative of the principles of the present invention. Numerous other arrangements may be devised by those skilled in the art without departing from the spirit and scope of the invention. For example, the actuation of the valve by the explosive gases generated when squib 14b is fired is but illustrative of the manner in which shearing member 12 is driven forward to shear the sealing disc 11a from fitting 11. Other means such as solenoid action, hydraulic fluid, et cetera, may be utilized for some applications.

What is claimed is:

1. In a normally closed explosive actuated valve having a fluid flow passage therethrough, an actuating chamber transversely intersecting said passage and a fluid line fitting with an integral disc sealing the end thereof positioned in said passage to block the flow of fluid therethrough with said disc extending into said chamber transverse to the longitudinal axis of said chamber, a shearing member for shearing said disc from said fitting to unblock said passage, said shearing member having a semi-cylindrical portion having a plane surface and a cylindrical surface slidably movable in said chamber, the plane surface of said portion having a cylindrical cavity adapted to receive and to provide support for said disc and a through hole which registers with said passage when said valve is in its actuated condition.

2. The shearing member defined in claim 1 also having a larger diameter disc-shaped portion integral with one end of said semi-cylindrical portion, said disc-shaped portion having a fluid flow passage therethrough to permit the equalization of the pressures applied to said shearing member by the fluid in said actuating chamber when said disc is sheared from said fitting.

3. A normally closed valve comprising in combination a valve body having an open fluid flow passage therethrough and a longitudinal actuating chamber bifurcating said passage, said chamber being sealed at one end, a fluid line fitting having an integral disc sealing the end thereof, said fitting being threaded into said passage with said disc projecting into said chamber transverse to the longitudinal axis of said chamber to block the flow of fluid through said passage, a shearing member slidably movable in said chamber into said passage, said shearing member having a through hole to communicate fluid through said passage when said valve is actuated, an actuating piston independently slidably movable in said chamber, means positioned at and sealing the end of said chamber opposite said sealed end for actuating said valve, said actuating means comprising driving means for driving said piston against said shearing member whereby said shearing member is driven longitudinally in said chamber to shear off said disc from said fitting and to register said through hole in said shearing member in said passage, and means including said actuating piston responsive to the flow of fluid through said passage for maintaining said through hole in said shearing member in registration in said passage.

4. The combination defined in claim 3 wherein said driving means comprises a squib positioned in said chamber and means for firing said squib and wherein said actuating piston also includes means providing a gas-tight seal in said chamber between said squib and said shearing member.

5. The combination defined in claim 3 wherein said shearing member also includes means for supporting said disc over the entire surface thereof when said disc is blocking said passage.

6. The combination defined in claim 5 wherein said means in said shearing member for supporting said disc comprises a cylindrical cavity into which said disc extends with the surface of said disc contacting the bottom of said cavity, said cavity further containing said disc when said disc is sheared off from said fitting to prevent blockage of said passage.

7. A normally-closed valve, comprising a valve body having an elongated valve chamber therein with a cylindrical wall surface, an elongated ram element mounted in said chamber for movement longitudinally thereof, said ram element having a generally cylindrical shape corresponding generally to said cylindrical wall surface, a portion of said ram having a flat surface on one side thereof and parallel to the axis of said ram, said portion of said ram having a recess therein and also having a port extending therethrough, a blind nipple element having a blind inner end inserted a substantial distance into said recess in said portion of said ram, the wall of said recess fully encompassing said blind inner end, wall means provided in said valve body to define an outlet fluid passage opposite said blind inner end of said nipple, and means to effect sudden and forceful shifting of said ram longitudinally of said valve chamber to shear off said blind inner end of said nipple and cause said port to be disposed between the remaining portion of said nipple and said outlet fluid passage to thereby create a flow passage therebetween.

8. The invention as claimed in claim 7, in which said nipple includes a relatively thick-walled portion disposed between said flat surface and the opposed interior wall of said valve body, and further includes means to cause said nipple to be relatively weak at said flat surface to thereby effect clean fracture of said nipple at said surface and also effect close sealing contact of the fractured end of said thick-walled portion with said surface upon longitudinal shifting of said ram.

9. The invention as claimed in claim 8, in which said last-named means includes a shoulder formed on said nipple at said surface between said thick-walled portion and a relatively thin-walled nipple portion disposed in said recess.

10. A normally closed valve comprising in combination a valve body having a fluid flow passage therethrough and an actuating chamber therein transversely intersecting said passage, a fluid line fitting having an integral disc sealing the end thereof, said fitting being threaded into said passage with said disc projecting into said chamber transverse to the longitudinal axis of said chamber to block the flow of fluid through said passage, a shearing member slidably movable in said chamber and having a cylindrical cavity into which said disc extends, driving means for driving said shearing member longitudinally in said chamber to shear off said disc from said fitting, said driving means comprising a squib positioned in said chamber, means for firing said squib, and an actuating piston independently slidably movable in said chamber and responsive to the explosive gases generated when said squib is fired for driving said shearing member longitudinally in said chamber to shear off said disc from said fititng, means in said shearing member for communicating fluid through said passage when said disc is sheared off from said fitting, and means in said shearing member for directing a portion of said fluid in said passage against said actuating piston for balancing the forces applied to said shearing member by said fluid in said passage.

11. The combination defined in claim 10 wherein said means in said shearing member for directing said portion of said fluid against said actuating piston comprises a fluid passage in said shearing member to permit the fluid flowing therethrough to apply a pressure against said actuating piston in the direction opposite to the pressure applied by said explosive gases.

12. The combination defined in claim 10 wherein said disc extends into said cavity the full depth thereof and in contacting relationship with the bottom of said cavity whereby said shearing member provides active support for said disc over the entire surface thereof when said valve is in its normally closed condition.

References Cited in the file of this patent
UNITED STATES PATENTS

| | | |
|---|---|---|
| 1,854,477 | McKissick | Apr. 19, 1932 |
| 2,365,364 | Temple | Dec. 19, 1944 |
| 2,659,517 | Reinhardt | Nov. 17, 1953 |
| 2,777,455 | Daudelin | Jan. 15, 1957 |
| 2,937,654 | Wilner | May 24, 1960 |